UNITED STATES PATENT OFFICE.

HENRY D. PERKY, OF GLENCOE, MARYLAND; LABAN SPARKS, ADMINISTRATOR OF SAID HENRY D. PERKY, DECEASED, ASSIGNOR, BY MESNE ASSIGNMENTS, TO THE SHREDDED WHEAT COMPANY, OF NIAGARA FALLS, NEW YORK.

REDUCING GROUND GRAIN TO ELONGATED OR FILAMENT FORM.

1,021,473.   Specification of Letters Patent.   Patented Mar. 26, 1912.

No Drawing.   Application filed January 19, 1906. Serial No. 296,871.

*To all whom it may concern:*

Be it known that I, HENRY D. PERKY, a citizen of the United States, resident of Glencoe, in the county of Baltimore and State of Maryland, have made a certain new and useful Invention in Processes of Reducing Ground Grain to Elongated or Filament Form; and I declare the following to be a full, clear, and exact description of the same, such as will enable others skilled in the art to which it appertains to make and use the invention.

The invention relates to a method or process of reducing grain to elongated or filament form for use as food; and the object of the invention is to render the product short and delicate by re-working the set material as described and thereby causing its particles to be loosened up and re-arranged, as hereinafter set forth.

In explaining the invention, it will be described in its application to corn, which for this purpose is deprived of its hull by any ordinary means, and is then reduced to a comminuted form by grinding. The ground material is mixed with about its bulk of water, or with so much as it will take up, depending upon the grain used, in thoroughly cooking it and at the same time bringing it to a semi-solid form which will harden or cake. The cooking is designed to be effected, usually, by inclosing the material with water, as above indicated, in a water-tight vessel, and immersing said vessel in boiling water or steam for a sufficient length of time. After the material has become cooled and set or hardened into solid or cake form it is subjected to filamentous reduction by means of a finely perforated plate of sheet metal or wire cloth. The material is in this way passed through the plate, whereby it is reduced to filaments which are somewhat "worked" in their passage through the perforations of the plate because of the division of their constituent particles from the "set" position which was normal to them in the solid mass. In this condition the filaments are not smooth, but have more or less roughness of structure due to the inequalities of the material, and the action of the perforations of the plate relative thereto. These filaments are then compressed together in solid form, and the material in this condition is again passed through the perforations of a plate to reduce it to elongated filaments, which are designed to have their moisture evaporated by means of a heater or oven. The finished product thus provided consists of thin elongated filaments, the normal relation of whose particles has been forcibly broken up and changed by the successive reductions so that they have a loose and delicate structure and a short or tender texture of homogeneous character, and the product is therefore believed to be suitable for use as an agreeable and salutary breakfast food.

What I claim as my invention and desire to secure by Letters Patent is—

The process of producing a mass of filamentous food, by cooking ground grain, cooling to a set or solid condition, subjecting the solid material to filamentous reduction, compressing the filaments together, subjecting the mass thus produced to a second filamentous reduction, and finally evaporating the moisture from the resultant.

In testimony whereof I affix my signature, in presence of two witnesses.

HENRY D. PERKY.

Witnesses:
 L. L. BURBANK,
 WM. C. BREED.